UNITED STATES PATENT OFFICE.

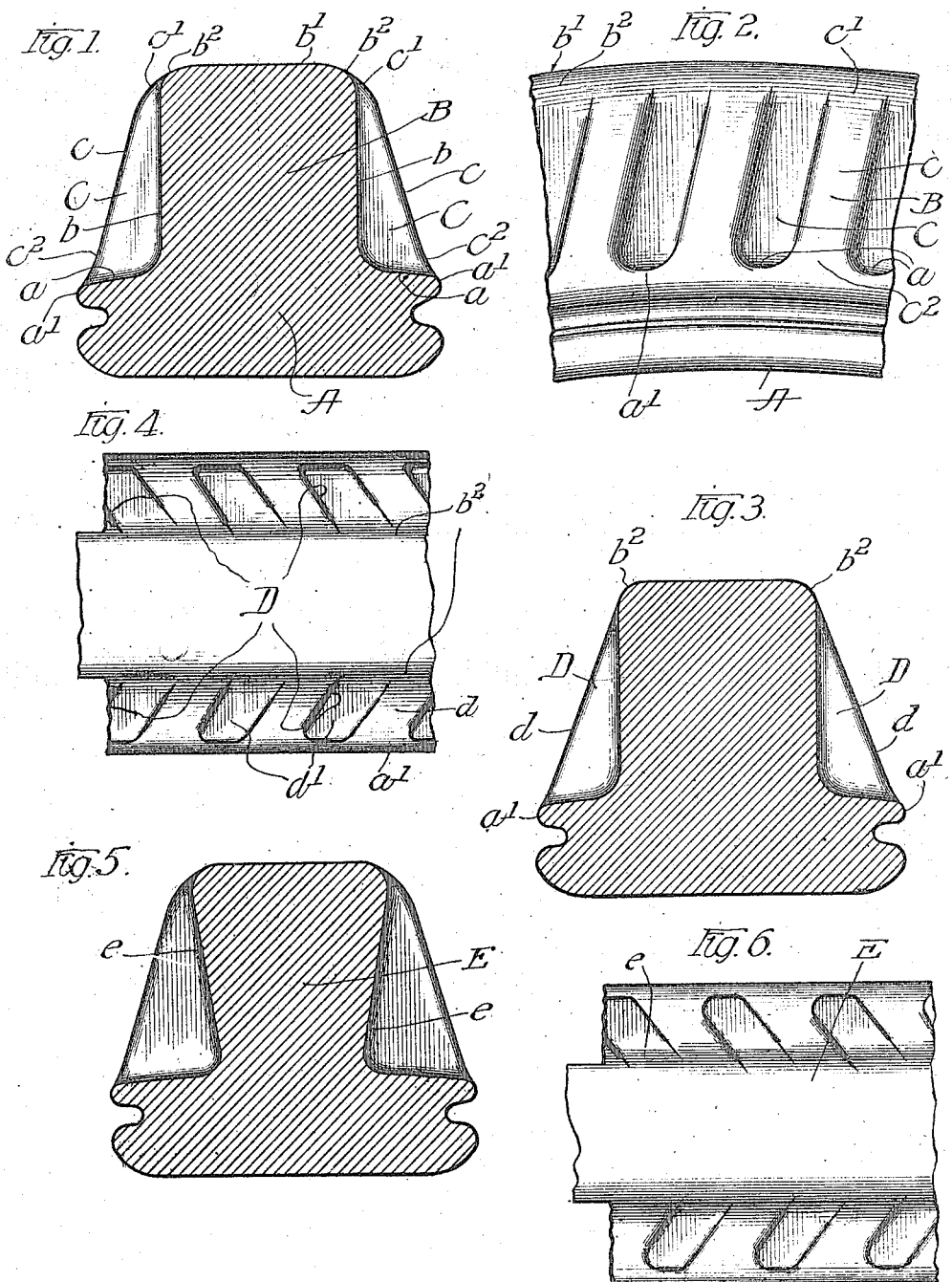

ALVARO S. KROTZ, OF JANESVILLE, WISCONSIN.

RUBBER TIRE.

1,152,324.

Specification of Letters Patent.

Patented Aug. 31, 1915.

Application filed April 20, 1914. Serial No. 833,093.

*To all whom it may concern:*

Be it known that I, ALVARO S. KROTZ, a citizen of the United States of America, and resident of Janesville, Rock county, Wisconsin, have invented a certain new and useful Improvement in Rubber Tires, of which the following is a specification.

This is an improvement on the construction disclosed in my prior application 785,137, filed August 16, 1913.

My invention relates to rubber vehicle tires of that kind in which a solid and central tread portion is provided at each side thereof with an irregular surface formed by lateral projections which prevent, or tend to prevent, lateral displacement of the tread portion, and which also serve to increase the resiliency of the tire, as well as to prevent the same from skidding on a slippery surface.

Generally stated, the object of my invention is to provide a rubber tire of the foregoing general character, but in which the lateral projections or ribs are so formed, arranged and combined with the tread portion and other elements that the tire will be efficient and durable in use, and will also be entirely satisfactory in other ways, not only from the standpoint of the user, but from that of the manufacturer as well.

To these and other useful ends my invention consists in matters hereinafter set forth and claimed.

In the accompanying drawings—Figure 1 is a cross section of a rubber tire embodying the principles of my invention. Fig. 2 is a side elevation of a section of said tire. Fig. 3 is a view similar to Fig. 1, showing another form of my invention. Fig. 4 is a plan of the form of tire shown in Fig. 3. Fig. 5 is a view similar to Fig. 1, showing still another form of my invention. Fig. 6 is a view similar to Fig. 4 showing the ribs on one side of the tire staggered relative to those on the other side.

As thus illustrated, and referring to Figs. 1 and 2, my invention comprises a rubber base portion A, a solid and continuous tread portion B integral therewith, and the lateral projections or ribs C, said ribs occupying the lateral channels formed between the upper surfaces $a$ of the base and the side surfaces $b$ of the tread portion. As shown in Figs. 1 and 2, the surfaces $b$ are vertical and parallel, being at right angles with the tread surface $b^1$ of the tire. The outer side surfaces $c$ of the ribs are straight and inclined inwardly toward the tread of the tire, when the latter is viewed in cross section, the upper ends of these sides $c$ being connected by short curves $c^1$ with the tread surface of the tire, and the lower ends of these ribs being connected by concave curves $c^2$ with the outer edges $a^1$ of the tire. These ribs C are, therefore, substantially triangular in shape, as shown in Fig. 1, being tapered upwardly or outwardly—that is to say, in a direction away from the axis of the wheel, and this tapering formation causing each rib to disappear or become practically nothing by the time the plane of the tread surface is reached. Thus the tapered or reduced ends of these ribs form no part of the normal tread of the tire, notwithstanding the fact that the spaces between these ribs are open at the tread—that is to say, these spaces are not covered at their outer ends, and are exposed to the ground when the tire is in action. As shown in Fig. 1, these ribs C can be radial to the axis of the wheel, and can be spaced apart in any suitable or desired manner; but as shown in Fig. 2 these ribs are arranged tangentially, being all inclined in the same direction, whereby each rib is flexed or bent backward toward the base of the tire when the tire is on the ground and in action. This adds to the resiliency of the tire, and at the same time these ribs serve to prevent, or tend to prevent, lateral displacement of the tread portion of the tire, or side roll as it is sometimes called. Considerable compression of the tire, when on the ground, may bring the outer ends of the ribs C into contact with the surface of the street, and in such case a more or less non-skidding effect is produced; but when not under compression the tread of the tire is formed only by the flat surface between the rounded corners $b^2$ at each side thereof.

As shown in Fig. 3 the construction is the same as that shown in Figs. 1 and 2, except that in this case the ribs D, which correspond to the ribs C, have straight sides $d$, or straight outer surfaces, extending directly from the rounded edges $b^2$ to the lower edges $a^1$, whereby these ribs D are more triangular in shape than those previously shown and described. In this case the tapered or reduced outer ends of the ribs have less opportunity or possibility of forming part of the tread, when the tire is under heavy compression, than is the case with the ribs shown in Figs. 1 and 2. It will be understood that the ribs D can be either radial or tangential, as previously described and explained.

As shown in Fig. 4, the spaces $d^1$ between the ribs D are disposed opposite each other—that is to say, those at one side of the tire are opposite those at the other side thereof; but in Fig. 6, it will be seen, the ribs at one side of the tire are opposite the spaces at the other side, so that the ribs of opposite sides have a staggered arrangement relative to each other.

As shown in Fig. 5 the construction is like that shown in Figs. 1 and 2, except that in this case the tread portion E tapers inward or toward the axis of the wheel, when the tire is viewed in cross section, whereby the sides $e$ are not vertical and parallel, but are oblique and disposed at an angle to each other, being closer together at the base of the tire than at the tread thereof. This formation will give added resiliency, owing to the reduction of the rubber between the base and the tread of the tire, whereby the ribs are caused to sustain more of the weight.

Thus in each case and in every form of the invention the triangular ribs taper toward the tread of the tire, when the latter is viewed in cross section, and each rib becomes practically nothing by the time it reaches the tread or tread portion which engages the ground. Owing to the slight curving or rounding of certain portions, the ribs are not entirely a sharp cornered or perfect triangle, but they are substantially flat sided and triangular in form when the tire is viewed in cross section. The said ribs are, it will be seen, in the general form of a right angle triangle, an acute angle triangle, an equilateral or isosceles triangle, when the tire is viewed in cross section, or any other similar formation.

As previously stated, my invention relates in a general way to the general class of rubber tires which are formed with special reference to resiliency, prevention of side roll, non-skidding and other qualities or characteristics; but while providing in a measure against skidding, my invention is more concerned with the problem of manufacture and the questions of resiliency, stability and durability, and other considerations as well; and one of the objects of my invention is to provide an improved construction and arrangement whereby certain features heretofore employed in tires of this kind are not necessary.

With further reference to the spaces between the ribs which are, as stated, substantially triangular in any case, as illustrated in the drawings, it will be seen that the construction and arrangement are such that these spaces are accessible vertically from the ground below. In other words, and when the tread of the tire is on the ground, the spaces at each side thereof overhang the tread and are set outwardly therefrom to such an extent that nothing intervenes between them and the ground. Thus the ribs are disposed immediately at opposite sides of the tread, so that the tread is directly between the two series of ribs, and whereby the tread is supported against lateral displacement throughout the entire body thereof. In other words, these ribs tend to yieldingly resist such lateral displacement or distortion of the tread, for when the tread is under compression the ribs at one side are crowded outward and away from the ribs at the other side.

It will also be seen that when the ribs are arranged tangentially, and when the tire is under compression on a smooth ground surface, such as a paved road, the operation is as follows:—The tread of the tire is compressed until one of the sides of each rib which faces the next rib is in contact with the ground, and this contact along the tangential side surface of the rib increases as the compression of the tread increases, and thus the ribs become deflected from their tangential positions when the tire is viewed from the side thereof; but it will be understood, of course, that the ribs then straighten out and assume their normal tangential positions as soon as they leave the ground. At the same time, however, and while the tread is thus under compression, the outer sides of the ribs (the sides which face outwardly away from the tire) are also brought into contact with the ground, to some extent, and this is especially true when the tire lurches to one side, for in such case the ribs have a tendency to roll under the tire and thereby increase the non-skidding effect thereof.

What I claim as my invention is:—

1. A rubber tire for vehicle wheels comprising a base portion and a tread portion, the base portion being wider than the tread of the tire, and ribs exposed to the ground and extending from the base across the sides of the tread portion, spaced apart along the sides of the tire, the outer sides of said ribs being inclined relative to the sides of the tread portion in such a manner that each rib in effect tapers gradually away from the base, being three cornered and substantially triangular in shape when the tire is viewed in cross section, and said tapering causing each rib to become practically nothing by the time it reaches the terminal thereof at the tread of the tire.

2. A rubber tire for vehicle wheels comprising a base portion and a tread portion, the base portion being wider than the tread of the tire, and ribs exposed to the ground and extending from the base across the sides of the tread portion, spaced apart along the sides of the tire, the outer sides of said ribs being inclined relative to the sides of the tread portion in such a manner that each rib in effect tapers gradually away from the base, when the tire is viewed in cross section, the spaces between the ribs being accessible vertically from the ground at each side of said tread, and said tapering causing each rib to become practically nothing by the time it reaches the terminal thereof at the tread of the tire, said ribs being disposed in position to engage the ground when the tire is compressed and arranged tangentially of the wheel.

3. A rubber tire for vehicle wheels comprising a base portion and a solid tread portion, the base portion being wider than the tread of the tire, and ribs exposed to the ground and extending from the base across the sides of the tread portion, spaced apart along the sides of the tire, the outer sides of said ribs being inclined relative to the sides of the tread portion in such a manner that each rib in effect tapers gradually away from the base, each rib thereby presenting a triangular outline when the tire is viewed in cross section, and said tapering causing each rib to become practically nothing by the time it reaches the terminal thereof at the tread of the tire, said tread portion being continuous, whereby the peripheral tread surface of the tire is formed only by the unbroken area of uniform width between the outer corners of the solid tread portion.

4. A rubber tire for vehicle wheels comprising a base portion and a tread portion, the base portion being wider than the tread of the tire, and ribs extending from the base across the sides of the tread portion, spaced apart along the sides of the tire, said ribs being arranged to contact with a flat ground surface only when the tread is under compression thereon, the outer sides of said ribs being inclined relative to the flat sides of the tread portion in such a manner that each rib in effect tapers gradually away from the base and each rib, being substantially triangular when the tire is viewed in cross section.

5. A rubber tire for vehicle wheels comprising a base portion and a tread portion, the base portion being wider than the tread of the tire, and ribs extending from the base across the sides of the tread portion, spaced apart along the sides of the tire, the outer sides of said ribs being inclined in such a manner that each rib in effect tapers gradually away from the base, being substantially triangular when tire is viewed in cross section, and said tapering causing each rib to become practically nothing by the time it reaches the terminal thereof at the tread of the tire, said ribs engaging the ground to an extent depending upon the degree of compression of said tread.

6. A rubber tire for vehicle wheels, comprising a base portion and a tread portion, said tread portion in cross section tapering with flat sides toward said base, and ribs extending from the base across the sides of the tread portion, spaced apart along the sides of the tire, said ribs being arranged to engage a flat ground surface only when the tread is under compression thereon, and each rib in effect tapering away from the base and being substantially triangular in form when the tire is viewed in cross section.

7. A rubber tire for vehicle wheels, comprising a base portion and a tread portion, and ribs extending from the base across the sides of the tread portion, spaced apart along the sides of the tire, each rib in effect tapering away from the base and being substantially triangular in form when the tire is viewed in cross section, said tapering causing each rib to become practically nothing by the time it terminates at the tread of the tire, and said ribs engaging the ground in the plane of said tread to an extent depending upon the degree of compression of said tread.

8. A rubber tire for vehicle wheels, comprising a base portion and a tread portion, and ribs extending from the base across the sides of the tread portion, spaced apart along the sides of the tire, each rib in effect tapering away from the base and being substantially triangular in form when the tire is viewed in cross section, said ribs thereby forming substantial lateral supports to brace the tread portion against side roll and yieldingly resist compression thereof, the arrangement of the ribs being such that they are tangential and subject to contact with the ground when the tire is on the wheel.

9. A rubber tire for vehicle wheels, comprising a base portion and a tread portion, and ribs extending from the base across the sides of the tread portion, spaced apart along the sides of the tire, each rib in effect tapering away from the base and being substantially triangular in form when the tire is viewed in cross section, said tapering causing each rib to become practically nothing by the time it terminates at the tread of the tire, and said ribs engaging the ground in the plane of said tread to an extent depending upon the degree of compression of said tread, the arrangement of the ribs being such that they are tangential when the tire is on the wheel.

10. A rubber tire for vehicle wheels, comprising a tread portion which tapers toward the wheel in cross section, and ribs which taper away from the wheel when the tire is viewed in cross section, disposed along the opposite sides of the tire, said ribs engaging the ground to an extent depending upon the degree of compression of said tread.

11. A rubber tire for vehicle wheels, comprising a tread portion which tapers toward the wheel in cross section, and ribs which taper away from the wheel when the tire is viewed in cross section, disposed along the opposite sides of the tire, said ribs engaging the ground to an extent depending upon the degree of compression of said tread, and said ribs when not distorted being tangential relative to the wheel.

12. A rubber tire for vehicle wheels, comprising a tread portion which tapers toward the wheel in cross section, and ribs which taper away from the wheel when the tire is viewed in cross section, disposed along the opposite sides of the tire, said ribs engaging the ground to an extent depending upon the degree of compression of said tread, the top and sides of said tread portion being straight in cross section, and each rib being triangular and having straight sides when the tire is viewed in cross section.

Signed by me at Janesville, Wisconsin, this 8 day of April 1914

ALVARO S. KROTZ.

Witnesses:
F. H. FARNSWORTH,
D. DONNELLY.